US012613804B2

(12) United States Patent
Kim et al.

(10) Patent No.: US 12,613,804 B2
(45) Date of Patent: *Apr. 28, 2026

(54) COMPUTING METHOD AND DEVICE WITH DATA SHARING

(71) Applicant: Samsung Electronics Co., Ltd., Suwon-si (KR)

(72) Inventors: Yoojin Kim, Suwon-si (KR); Channoh Kim, Suwon-si (KR); Hyun Sun Park, Suwon-si (KR); Sehwan Lee, Suwon-si (KR); Jun-Woo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,355

(22) Filed: Mar. 27, 2024

(65) Prior Publication Data

US 2024/0232091 A1　　Jul. 11, 2024

Related U.S. Application Data

(63) Continuation of application No. 17/317,339, filed on May 11, 2021, now Pat. No. 11,971,823.

(30) Foreign Application Priority Data

Nov. 24, 2020　　(KR) ........................ 10-2020-0158952

(51) Int. Cl.
　　*G06F 12/0862*　　(2016.01)
　　*G06F 1/04*　　(2006.01)
　　　　(Continued)

(52) U.S. Cl.
　　CPC ...... *G06F 12/0862* (2013.01); *G06F 12/0804* (2013.01); *G06F 1/04* (2013.01); *G06F 2212/1021* (2013.01); *G06N 3/04* (2013.01)

(58) Field of Classification Search
　　CPC ................................. G06N 3/04; G06N 3/045
　　See application file for complete search history.

(56) References Cited

U.S. PATENT DOCUMENTS

2015/0172852 A1　6/2015　Joo
2016/0350194 A1　12/2016　Mohan et al.
　　　　(Continued)

FOREIGN PATENT DOCUMENTS

CN　　110046700　A　　7/2019
CN　　110046702　A　　7/2019
　　　　(Continued)

OTHER PUBLICATIONS

Chen, et al. "Diannao: A small-footprint high-throughput accelerator for ubiquitous machine-learning." ACM SIGARCH Computer Architecture News 42.1 (2014): (15 pages in English).
　　　　(Continued)

*Primary Examiner* — Getente A Yimer
(74) *Attorney, Agent, or Firm* — NSIP Law

(57) ABSTRACT

A computing method and device with data sharing re provided. The method includes loading, by a loader, input data of an input feature map stored in a memory in loading units according to a loading order, storing, by a buffer controller, the loaded input data in a reuse buffer of an address rotationally allocated according to the loading order, and transmitting, by each of a plurality of senders, to an executer respective input data corresponding to each output data of respective convolution operations among the input data stored in the reuse buffer, wherein portions of the transmitted respective input data overlap other.

36 Claims, 7 Drawing Sheets

(51) Int. Cl.

| | | |
|---|---|---|
| *G06F 12/0804* | (2016.01) | |
| *G06F 17/15* | (2006.01) | |
| *G06F 17/16* | (2006.01) | |
| *G06N 3/04* | (2023.01) | |
| *G06N 3/045* | (2023.01) | |
| *G06N 3/0464* | (2023.01) | |
| *G06N 3/063* | (2023.01) | |
| *G06N 3/08* | (2023.01) | |

(56) References Cited

U.S. PATENT DOCUMENTS

| | | | |
|---|---|---|---|
| 2018/0159561 A1 | 6/2018 | Han | |
| 2018/0173590 A1 | 6/2018 | Cai et al. | |
| 2018/0212894 A1* | 7/2018 | Nicol | G06F 13/1689 |
| 2018/0285715 A1* | 10/2018 | Son | G06N 3/045 |
| 2018/0373999 A1* | 12/2018 | Xu | G06V 20/49 |
| 2019/0220739 A1* | 7/2019 | Kwon | G06N 3/045 |
| 2019/0303757 A1* | 10/2019 | Wang | G06N 3/045 |
| 2019/0340501 A1 | 11/2019 | Mills | |
| 2020/0042860 A1 | 2/2020 | Sun et al. | |
| 2020/0097778 A1 | 3/2020 | Rozner et al. | |
| 2020/0160161 A1* | 5/2020 | Yoo | G06N 3/04 |
| 2021/0295138 A1 | 9/2021 | Symes et al. | |
| 2022/0067498 A1 | 3/2022 | Park | |

FOREIGN PATENT DOCUMENTS

| | | |
|---|---|---|
| KR | 10-2018-0050928 A | 5/2018 |
| KR | 10-2018-0123846 A | 11/2018 |

OTHER PUBLICATIONS

Chinese Office Action Issued on Jul. 26, 2025, in Counterpart Chinese Patent Application No. 202110570492.8 (14 Pages in English, 9 Pages in Chinese).

\* cited by examiner

COMPUTING METHOD AND DEVICE WITH DATA SHARING

CROSS-REFERENCE TO RELATED APPLICATIONS

This application is a Continuation Application of U.S. patent application Ser. No. 17/317,339 filed on May 11, 2021, which claims the benefit under 35 USC § 119(a) of Korean Patent Application No. 10-2020-0158952, filed on Nov. 24, 2020, in the Korean Intellectual Property Office, the entire disclosure of which is incorporated herein by reference for all purposes.

BACKGROUND

1. Field

The following description relates to a computing method and device with data sharing.

2. Description of Related Art

Deep learning technology refers to a neural network, for example, with a plurality of layers, each composed of a plurality of processing nodes, that may be trained with a large amount of training data, for example. To increase the accuracy of inference of the neural network, a large amount of training data may be utilized. As a non-limiting examples, the training data may include image, sound, or text information.

A convolutional neural network (CNN) may improve the accuracy of image classification and recognition, for example, through implementation of a convolutional operation.

However, implementation of such a CNN-based model may use a large amount of computational resources. In addition, as an amount of training data for training such a CNN-based model increases, the utilized resources may also increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes loading, by a loader, input data of an input feature map stored in a memory in loading units according to a loading order, storing, by a buffer controller, the loaded input data in a reuse buffer of an address rotationally allocated according to the loading order, and transmitting, by each of a plurality of senders, to an executer respective input data corresponding to each output data of respective convolution operations among the input data stored in the reuse buffer, wherein portions of the transmitted respective input data overlap other.

A portion of a transmitted input data of the transmitted respective input data may be stored in the reuse buffer by the storing of the loaded input data, and another portion of the transmitted input data may be obtained through spatial and/or temporal sharing of same data stored in the reuse buffer.

The respective input data may not be redundantly stored in the reuse memory.

With respect to previous input data and current input data that may be included in the loaded input data, in response to an address allocated to the previous input data being a last address of the reuse buffer, an address to be allocated to the current input data may be a first address of the reuse buffer.

The loading may include loading remaining input data, other than input data overlapping input data loaded in a previous clock, among input data corresponding to output data on which a convolution operation is to be performed.

The plurality of senders may include a first sender and a second sender, where in the previous clock, the first sender may correspond to first output data, the second sender may correspond to second output data adjacent to the first output data, and loaded first input data, second input data, third input data, fourth input data, fifth input data, and sixth input data may be stored in a first address, a second address, a third address, a fourth address, a fifth address, and a sixth address of the reuse buffer, respectively. In a current clock, the first sender may correspond to third output data and the second sender may correspond to fourth output data adjacent to the third output data, and the loading may include loading the remaining input data other than the fifth input data and the sixth input data overlapping input data loaded in the previous clock among the fifth input data, the sixth input data, seventh input data, eighth input data, ninth input data, and tenth input data corresponding to the third output data and the fourth output data.

The method may further include flushing an address allocated to remaining input data, other than input data overlapping input data corresponding to output data on which a convolution operation is to be performed, among input data loaded in a previous clock.

The plurality of senders may include a first sender and a second sender, where in the previous clock, the first sender may correspond to first output data, the second sender may correspond to second output data adjacent to the first output data, and loaded first input data, second input data, third input data, fourth input data, fifth input data, and sixth input data may be stored in a first address, a second address, a third address, a fourth address, a fifth address, and a sixth address of the reuse buffer, respectively. In a current clock, the first sender may correspond to third output data and the second sender may correspond to fourth output data adjacent to the third output data, and flushing addresses allocated to the first input data, the second input data, the third input data, and the fourth input data, as the remaining input data, other than the fifth input data and the sixth input data overlapping input data corresponding to the third output data and the fourth output data.

The plurality of senders may include a first sender and a second sender, where the first sender may correspond to first output data, the second sender may correspond to second output data adjacent to the first output data, first input data, second input data, third input data, fourth input data, fifth input data, and sixth input data may be stored in a first address, a second address, a third address, a fourth address, a fifth address, and a sixth address of the reuse buffer, respectively, and the transmitting may include transmitting, by the first sender, the first input data, the second input data, the third input data, and the fourth input data to the executer to perform a first convolution operation, and transmitting, by the second sender, the third input data, the fourth input data, the fifth input data, and the sixth input data to the executer to perform a second convolution operation.

The method may further include performing, by a neuro processor unit (NPU) or neural accelerator that include the executer, the respective convolution operations of the respective input data and corresponding convolution weights, to generate respective outputs of an output map.

The reuse buffer may include a first reuse buffer and a second reuse buffer and the storing may include allocating, by the buffer controller, an address of the first reuse buffer or the second reuse buffer rotationally to the loaded input data according to the loading order.

In one general aspect, examples include a non-transitory computer-readable storage medium storing instructions that, when executed by a processor, configure the processor to perform any process or method or combinations of processes or methods described herein.

In one general aspect, a processor-implemented method of a fetcher that includes a first reuse buffer and a second reuse buffer, includes loading, by a loader of a fetcher, input data of an input feature map stored in a memory in loading units according to a loading order, allocating, by a buffer controller of the fetcher, an address of the first reuse buffer or the second reuse buffer rotationally to the loaded input data according to the loading order, and storing the loaded input data in the allocated address, and transmitting, by each of a plurality of senders, to an executer respective input data corresponding to output data of respective convolution operations among input data stored in the first reuse buffer or the second reuse buffer, wherein portions of the transmitted respective input data overlap.

A portion of the transmitted respective input data may be stored in the first reuse buffer or the second reuse buffer by the storing of the loaded input data, and another portion of the transmitted respective data may be obtained through spatial and/or temporal sharing of same data stored in the first reuse buffer or the second reuse buffer.

The respective input data corresponding to each of the output data of the respective convolution operations may not be redundantly stored in either of the first reuse memory or the second reuse memory.

With respect to previous input data and current input data that is included in the loaded input data, in response to an address allocated to the previous input data being a last address of the first reuse buffer, an address to be allocated to the current input data may be a first address of the first reuse buffer, and in response to the address allocated to the previous input data being a last address of the second reuse buffer, the address to be allocated to the current input data may be a first address of the second reuse buffer.

With respect to previous input data and current input data that is included in the loaded input data, in response to an address allocated to the previous input data being a last address of the first reuse buffer, an address to be allocated to the current input data may be a first address of the second reuse buffer, and in response to the address allocated to the previous input data being a last address of the second reuse buffer, the address to be allocated to the current input data may be a first address of the first reuse buffer.

The loading may include loading remaining input data, other than input data overlapping input data loaded in a previous clock, among input data corresponding to output data on which a convolution operation is to be performed.

The method may include flushing an address allocated to remaining input data, other than input data overlapping input data corresponding to output data on which a convolution operation is to be performed, among input data loaded in a previous clock.

In one general aspect, a computing device includes a loader, a plurality of senders, a buffer controller, a reuse buffer, wherein the loader is configured to load input data of an input feature map stored in a memory in loading units according to a loading order, the buffer controller is configured to store the loaded input data in the reuse buffer of an address rotationally allocated according to the loading order, each of the plurality of senders is configured to transmit, to an executer, respective input data corresponding to each output data of respective convolution operations among the input data stored in the reuse buffer, and portions of the transmitted respective input data overlap.

With respect to previous input data and current input data included in the loaded input data, in response to an address allocated to the previous input data being a last address of the reuse buffer, an address to be allocated to the current input data may be a first address of the reuse buffer.

The loader may be configured to load remaining input data, other than input data overlapping input data loaded in a previous clock, among input data corresponding to output data on which a convolution operation is to be performed.

The plurality of senders may include a first sender and a second sender, where in the previous clock the first sender may correspond to first output data, the second sender may correspond to second output data adjacent to the first output data, and loaded first input data, second input data, third input data, fourth input data, fifth input data, and sixth input data may be stored in a first address, a second address, a third address, a fourth address, a fifth address, and a sixth address of the reuse buffer, respectively. In a current clock, the first sender may correspond to third output data and the second sender may correspond to fourth output data adjacent to the third output data, and the loader may be configured to load the remaining input data other than the fifth input data and the sixth input data overlapping input data loaded in the previous clock among the fifth input data, the sixth input data, seventh input data, eighth input data, ninth input data, and tenth input data corresponding to the third output data and the fourth output data on which a convolution operation is to be performed.

The buffer controller may be configured to flush an address allocated to remaining input data other than input data overlapping input data corresponding to output data on which a convolution operation is to be performed among input data loaded in a previous clock.

The plurality of senders may include a first sender and a second sender, where in the previous clock the first sender may correspond to first output data, the second sender may correspond to second output data adjacent to the first output data, and loaded first input data, second input data, third input data, fourth input data, fifth input data, and sixth input data may be stored in a first address, a second address, a third address, a fourth address, a fifth address, and a sixth address of the reuse buffer, respectively. In a current clock, the first sender may correspond to third output data and the second sender may correspond to fourth output data adjacent to the third output data, and the loader may be configured to flush addresses allocated to the first input data, the second input data, the third input data, and the fourth input data, as the remaining input data, other than the fifth input data and the sixth input data overlapping input data corresponding to the third output data and the fourth output data on which a convolution operation is to be performed among input data loaded in the previous clock.

The plurality of senders may include a first sender and a second sender, where the first sender may correspond to first output data, the second sender may correspond to second output data adjacent to the first output data, first input data, second input data, third input data, fourth input data, fifth input data, and sixth input data may be stored in a first address, a second address, a third address, a fourth address, a fifth address, and a sixth address of the reuse buffer, respectively. The first sender may be configured to transmit the first input data, the second input data, the third input data, and the fourth input data to the executer, and the second sender may be configured to transmit the third input data, the fourth input data, the fifth input data, and the sixth input data to the executer.

In one general aspect, a computing device includes a loader, a plurality of senders, a buffer controller, and a plurality of reuse buffers, wherein the plurality of reuse buffers includes a first reuse buffer and a second reuse buffer, the loader is configured to load input data of an input feature map stored in a memory in loading units according to a loading order, the buffer controller is configured to allocate an address of the first reuse buffer or the second reuse buffer rotationally to the loaded input data according to the loading order, and store the loaded input data in the allocated address, each of the plurality of senders is configured to transmit, to an executer, respective input data corresponding to output data of respective convolution operations among input data stored in the first reuse buffer or the second reuse buffer, and portions of the transmitted respective input data overlap.

With respect to previous input data and current input data included in the loaded input data, in response to an address allocated to the previous input data being a last address of the first reuse buffer, an address to be allocated to the current input data may be a first address of the first reuse buffer, and in response to the address allocated to the previous input data being a last address of the second reuse buffer, the address to be allocated to the current input data may be a first address of the second reuse buffer.

With respect to previous input data and current input data included in the loaded input data, in response to an address allocated to the previous input data being a last address of the first reuse buffer, an address to be allocated to the current input data may be a first address of the second reuse buffer, and, in response to the address allocated to the previous input data being a last address of the second reuse buffer, the address to be allocated to the current input data may be a first address of the first reuse buffer.

The loader may be configured to load remaining input data other than input data overlapping input data loaded in a previous clock among input data corresponding to output data on which a convolution operation is to be performed.

The buffer controller may be configured to flush an address allocated to remaining input data other than input data overlapping input data corresponding to output data on which a convolution operation is to be performed among input data loaded in a previous clock.

In one general aspect, a computing device includes a memory, a fetcher, a buffer controller, an executer, and a storage, wherein the fetcher includes a loader, a plurality of senders, and a reuse buffer, where the loader is configured to load input data of an input feature map stored in the memory in loading units according to a loading order, the buffer controller is configured to allocate an address of the reuse buffer to the loaded input data rotationally according to the loading order and store the loaded input data in the allocated address, each of the plurality of senders is configured to transmit, to the executer, respective input data corresponding to each output data of respective convolution operations among the input data stored in the reuse buffer, and portions of transmitted respective input data overlap.

The executer may be configured to perform the respective convolution operations with respect to the respective input data received from each of the plurality of senders, output output data corresponding to each of the plurality of senders, and store the output data in the storage.

In one general aspect, a processor-implemented method of a computing device includes loading, in loading units according to a loading order, input data of an input feature map stored in a memory exterior to the computing device, storing the loaded input data in a reuse buffer of the computing device according to addresses allocated according to the loading order, and transmitting to an executer respective input data, corresponding to each output data of respective convolution operations, among the input data stored in the reuse buffer, wherein a portion of the transmitted respective input data may be spatially and/or temporally shared with respect to a single storing of the portion in the reuse memory.

The respective input data may not be redundantly stored in the reuse memory.

The method may further include performing, by a neuro processor unit (NPU) or neural accelerator that include the executer, the respective convolution operations of the respective input data and corresponding convolution weights, to generate respective outputs of an output map, and storing the output map to an output memory exterior of the computing device.

The computing device may be the NPU or the neural accelerator.

Of the addresses allocated according to the loading order, an address to be allocated to current input data may be a first address of the reuse buffer based on an address, allocated to immediately previous loaded input data stored to the reuse buffer, being a last address of the reuse buffer.

Through the temporal sharing, the other portion of the transmitted respective input data may be a same input data stored in the reuse buffer in a previous storing of previously loaded input data for one or more other convolution operations, wherein the respective input data corresponding to each of the output data of the respective convolution operations may include remaining data loaded in the loading of the input data of the input feature map.

The method may further include flushing an address allocated to a previous remaining input data, other than the portion of the transmitted respective input data and the other portion of the transmitted respective input data, among input data loaded in a previous clock.

Other features and aspects will be apparent from the following detailed description, the drawings, and the claims.

Figure 1:
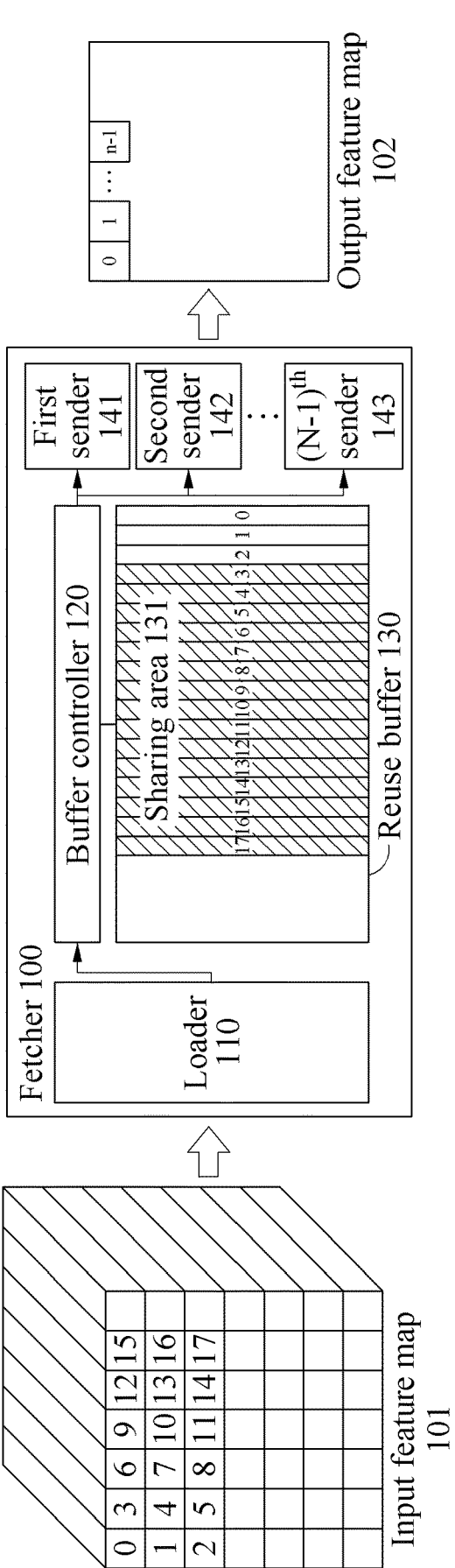
FIG. 1 is a diagram illustrating an example data sharing in convolution operations using a fetcher.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, some descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component, or intervening components may be present.

As used herein, the singular forms "a," "an," and "the" are intended to include the plural forms as well, unless the context clearly indicates otherwise. It should be further understood that the terms "comprises" and/or "comprising," when used in this specification, specify the presence of stated features, integers, operations, elements, components or a combination thereof, but do not preclude the presence or addition of one or more other features, integers, operations, elements, components, and/or groups thereof. The use of the term "may" herein with respect to an example or embodiment (e.g., as to what an example or embodiment may include or implement) means that at least one example or embodiment exists where such a feature is included or implemented, while all examples are not limited thereto.

Unless otherwise defined herein, all terms including technical or scientific terms used herein have the same meaning as commonly understood by one of ordinary skill in the art to which examples belong based on an understanding of the disclosure of this application. It will be further understood that terms, such as those defined in commonly-used dictionaries, should be interpreted as having a meaning that is consistent with their meaning in the context of the relevant art and the disclosure of this application and will not be interpreted in an idealized or overly formal sense unless expressly so defined herein.

FIG. 1 is a diagram illustrating an example data sharing in convolution operations using a fetcher.

In an example embodiment, a neural processing unit (NPU) processes a plurality of data in parallel. The NPU is a processing device that may include hardware optimized for parallel processing of matrix or convolutional operations, for example, and may exhibit a higher operation speed than general processors, such as a central processing unit (CPU).

Accordingly, the NPU may perform a process of fetching data from a memory, analyzing the fetched data, and computing the analyzed data. Here, a fetcher 100 may perform the fetching of the data from the memory and share fetched data. The fetcher 100 may also be referred to as a fetching unit (FU).

The fetcher 100 may perform memory access to fetch data stored in a memory, and may include one or more illustrated loaders 110. Rather, when a plurality of loaders are used in a typical fetcher for processing of a large quantity of data, a required memory bandwidth may increase, which may cause a memory bottleneck phenomenon.

In one or more embodiments, a computing device may reduce a memory access count by reusing data by the fetcher 100. The fetcher 100 may share memory bandwidth resources with several processing elements (PEs), e.g., of the NPU, thereby reducing the occurrence of such a memory bottleneck phenomenon of typical fetchers.

To this end, the fetcher 100 may include the loader 110, a plurality of senders 141 and 142 through 143, a buffer controller 120, and a reuse buffer 130. The reuse buffer 130 may be a space in which input data read by the loader 110 is stored. The input data may include an input feature map 101. As noted above, the loader 110 is further representative of one or more loaders 110, for example. In addition, while the input data is referred to as the input feature map 101, the input feature map 101 is representative of each of input image(s) information and of a processing of such input image information, such as through one or more previous neural network layers, in various examples.

The buffer controller 120 may calculate an address for writing the loaded input data and then write the loaded input data at the calculated address The buffer controller 120 may also flush a previously allocated address. The buffer controller 120 may calculate the allocated address of the reuse buffer 130 based on a load counter, a loading unit, a size of the reuse buffer 130, and a total number of data to be shared. The buffer controller 120 may also calculate an address for the flushing based on a send counter of each sender.

The senders 141, and 142 through 143 transmit input data stored in the reuse buffer 130 to an executer. For example, the senders 141, 142, and 143 may fetch input data corresponding to each output data of respective convolution operations from the reuse buffer 130 and transmit the fetched input data to the executer. Each of the senders 141, 142, and 143 may transmit input data used for output data while increasing the send counter one by one. Each of the senders 141, 142, and 143 corresponds to each output data. For example, output data may include an output feature map 102. An address of a buffer to be read by the sender may be calculated in advance. An address of a reuse buffer of input data to be transmitted may be calculated based on the send counter. Data fetched by the senders 141, 142, and 143 may overlap each other. The senders 141, 142, and 143 may share the data stored in the reuse buffer 130.

The executer may perform the convolution operations in parallel. For example, in an example of N senders, the executer may perform the convolution operations on input data input from the N senders in parallel. The executer may also be referred to as an executing unit. The output data may be stored in a memory or other storage, or otherwise output. For example, the executing unit may include hardware multiply and accumulate (MAC) processing elements (PE) configurations. As a non-limiting example, the executing unit may be a neural network accelerator or the NPU, or may be representative of parallel processors that are configured, such as through execution of instructions stored in a computer readable recording medium, to perform convolution operations based upon receipt of the data transmitted by the senders 141 through 143 and one or more convolutional weights. As a non-limiting example, FIG. 7 demonstrates such an executing unit in executer 720, where the executer 720 may be such a NPU or neural network accelerator. In another example, the fetcher 100 and the executer 720 be included in a same computing apparatus, as the NPU, neural network accelerator, or other computing devices.

Accordingly, the fetcher 100 may reuse data through the reuse buffer 130. For example, the fetcher 100 may spatially or temporally reuse the data stored in the reuse buffer 130. The data stored in the reuse buffer 130 may be spatially reused by a plurality of senders sharing the data. The shared data of the reuse buffer 130 may be referred collectively as the sharing area 131. When previously loaded data for another convolution operation overlaps data of current convolution operation, the overlapping data may be maintained from the previous loading for temporal reuse (sharing) in the current convolution operation.

The loader 110 loads input data of the input feature map 101 stored in a memory, and in particular may load the input data in loading units according to a loading order, for example. The loader 110 may load input data used in convolution operations in consideration of data sharing, e.g., so the loading of input data does not load data redundantly with respect to multiple convolution operations that are performed spatially by different senders in a same time corresponding to a same clock, and/or that are performed temporally by sender(s) at different times corresponding to different clocks. The loader 110 may load the input data from the memory while increasing a load counter one by one. The load counter may be used for calculating an address of the reuse buffer. The input feature map 101 may be, or have been, acquired through a pre-trained neural network, or as noted above the input feature map 101 may be a captured image, e.g., in one or more channels. The pre-trained neural network may generate the input feature 101 map by extracting feature(s) from an input image, and store the input feature map 101 in the memory. Here, the loading unit may be the total number of input data loaded at one time. For example, the loading unit may be smaller in size than the total addresses of the reuse buffer 130. The loading unit may correspond to a clock. For example, the loader 110 may load data in the loading unit during or in response to a first clock, and then load subsequent data in the loading unit during or in response to a second clock.

The loading order may be an order in which data is selectively determined to be loaded. For example, the loading order may be determined in a priority in a vertical direction from upper left to lower right. For example, if a convolution weight is 2×2, the corresponding input data of the input feature map 101 may be loaded in an order of upper left, lower left, upper right, and lower right of the corresponding input data, and thus, based on the size of the convolution weight. However, this loading order is merely an example, as various examples include the data being loaded in various or alternate orders.

The buffer controller 120 may flush an address allocated to some of the previously loaded input data, e.g., loaded in a previous clock, corresponding to a previous convolution operation that no longer overlaps with input data corresponding to a current and future convolution operations that are to be performed. When flushing addresses, the buffer controller 120 may flush addresses previous to a smallest address among addresses to be allocated. Through this, an address to be allocated to newly loaded data may be secured while keeping or maintaining previously loaded data that is to be reused in a next clock. Herein, overlapping data refers to data previously loaded, for use in a previous or other convolution operation, that is to be reused in a current or later convolution operation, or refers to data for a current convolution operation that does not need to be loaded in the current clock because the data is already being retained from use in the previous or the other convolution operation. For example, a current convolution operation may be performed using newly loaded data and overlapping data that also corresponded to a previous or other convolution operation.

The loader 110 may thus load input data, other than input data that would overlap input data loaded in a previous clock among input data on which a convolution operation is to be performed to generate a corresponding output data. Thus, the previously loaded overlapping input data may be reused for a convolution operation of a current clock. As such, the data may be temporally shared between different processing times or different clocks.

The buffer controller 120 stores the loaded input data in the reuse buffer 130 of an address that may be rotationally allocated according to the loading order. With respect to previous input data and the current input data included in the loaded input data, when an address allocated to the previous input data is a last address of the reuse buffer 130, an address to be allocated to the current input data may be a first address of the reuse buffer 130.

In an example, the plurality of senders 141, 142, and 143 may each correspond to respective output data of convolution operations. For example, one sender may transmit one or more input data for one output data to the executer, e.g., the plurality of senders 141, 142, and 143 may transmit, to the executer, corresponding input data, among all input data stored in one reuse buffer 130, for which a convolution weight is to be applied, and for which a corresponding output data is generated as a result of the application of the convolution weight to the transmitted corresponding input data. In this manner, a plurality of senders may spatially share some of the same input data stored in the reuse buffer 130 during or in response to the same clock.

For example, a size of a convolution weight of a convolution operation may be 2×2, and the fetcher 100 may include a first sender and a second sender. An output of the convolution operation may be an output feature map. The output feature map may include first output data and second output data adjacent to the first output data. The first sender may correspond to the first output data, i.e., for sending data corresponding to a first convolution operation to generate the first output data. The second sender may correspond to the second output data, adjacent to the first output data, i.e., for sending data corresponding to a second convolution operation to generate the second output data. The first output data may correspond to first input data, second input data, third input data, and fourth input data, e.g., the first convolution operation may apply the 2×2 convolution weight to the collective first input data, second input data, third input data, and fourth input data, to generate the first output data. The second output data may correspond to the third input data, the fourth input data, fifth input data, and sixth input data, e.g., the second convolution operation may apply the 2×2 convolution weight to the collective third input data, the fourth input data, fifth input data, and sixth input data, to generate the second output data.

When the loading unit is six, in a first clock the loader 110 may load the illustrated (indexed) first input data ("0"), the second input data ("1"), the third input data ("3"), the fourth input data ("4"), the fifth input data ("6"), and the sixth input data ("7") included in the input feature map. The buffer controller 120 may store the first input data, the second input data, the third input data, the fourth input data, the fifth input data, and the sixth input data in a first address, a second address, a third address, a fourth address, a fifth address, and a sixth address of the reuse buffer 130, respectively.

The first sender may transmit the first input data, the second input data, the third input data, and the fourth input data to the executer. The second sender may transmit the third input data, the fourth input data, the fifth input data, and the sixth input data to the executer. Here, the third input data and the fourth input data may be data loaded by the loader 110 once and stored in the reuse buffer 130 once. As such, the third input data and the fourth input data may be considered overlapping data, and thus, may be shared by the first sender and the second sender.

In a second clock, the first sender may correspond to third output data and the second sender may correspond to fourth output data adjacent to the third output data. The third output data may correspond to the illustrated (indexed) fifth input data ("6"), sixth input data ("7"), seventh input data ("9"), and eighth input data ("10"), e.g., the third convolution operation may apply the convolution weight to the collective fifth input data, the sixth input data, seventh input data, and eighth input data, to generate the third output data. The fourth output data may correspond to the illustrated (indexed) seventh input data ("9"), the eighth input data ("10"), ninth input data ("12"), and tenth input data ("13"), e.g., the fourth convolution operation may apply the convolution weight to the collective seventh input data, the eighth input data, ninth input data, and tenth input data, to generate the fourth output data.

In the second clock, the buffer controller 120 may also flush addresses of remaining input data, e.g., data loaded in the previous clock other than the fifth input data and the sixth input data that is overlapping data of the current clock corresponding to the third output data and the fourth output data. For example, in the current second clock, the buffer controller 120 may flush addresses allocated to the first input data, the second input data, the third input data, and the fourth input data, but not the fifth input data and the sixth input data. As another example, the buffer controller 120 may flush only addresses allocated to the first input data and the third input data, as the second input data and the fourth input data may be reused in a later clock performed convolution corresponding to a later generated output data. The buffer controller 120 may perform the flushing of addresses before loading of new input data, perform the flushing of addresses after the loading of the new input data, or variously order flushing and loading based on the circumstances of the reuse buffer 130.

In a future clock, the first sender may correspond to a next output line's first output data and the second sender may correspond to the next output line's second output data adjacent to the next output line's first output data, in the output feature map 102. Here, the next output line's first output data may correspond to the illustrated second input data ("1"), subsequent second input data ("2"), fourth input data ("4"), and subsequent fourth input data ("5"), e.g., demonstrating the reuse of the second input data and the fourth input data from the first clock described above. The adjacent next output line's second output data may correspond to the illustrated fourth input data ("4"), the subsequent fourth input data ("5"), the sixth input data ("7"), and subsequent sixth input data ("8"), e.g., demonstrating the reuse of the fourth input data and the sixth input data. In this future clock example, the buffer controller 120 may also flush, or have previously flushed, addresses corresponding to the illustrated inputs ("0"), ("3"), ("9"), ("12"), and ("15"), as these inputs may not overlap with corresponding inputs of any subsequent clocks of this next or remaining output lines of the output feature map 102.

As an alternative discussed above, in this future or previous clocks, the addresses corresponding to the second input data, the fourth input data, and the sixth input data may also be, or have been, flushed, and thus, in this future clock each of the second input data ("1"), subsequent second input data ("2"), fourth input data ("4"), subsequent fourth input data ("5"), the sixth input data ("7"), and subsequent sixth input data ("8"), may be loaded in the loading unit of six inputs, e.g., in any of the described loading orders.

In another example, the fetcher 100 may include the loader 110, the plurality of senders 141 through 143, the buffer controller 120, and a plurality of the reuse buffers 130. The fetcher 110 may include N senders and M reuse buffers, e.g., where M<N. For example, the plurality of reuse buffers may include a first reuse buffer and a second reuse buffer. Data stored in at least one reuse buffer may be shared by the plurality of senders in a same clock and/or across plural clocks.

Accordingly, as described above, the loader 110 may load input data of the input feature map 101 stored in the memory in the loading units according to a loading order. The buffer controller 120 may allocate an address of the first reuse buffer or the second reuse buffer rotationally to the loaded input data according to the loading order and store the loaded input data in the allocated address.

Each of the plurality of senders may transmit input data corresponding to output data of respective convolution operations among input data stored in the first reuse buffer or the second reuse buffer to an executer. Portions of input data transmitted by the plurality of senders may overlap each other, e.g., some data, of all of the respective data transmitted by each of the plurality of senders, may include the same singularly loaded input data.

In an example, the example first reuse buffer and the second reuse buffer may form a single address system. The buffer controller may allocate the addresses of the first reuse buffer and the second reuse buffer rotationally in accordance with the input data loaded according to the loading order. With respect to previous input data and current input data included in the loaded input data, when an address allocated to the previous input data is a last address of the first reuse buffer, an address to be allocated to the current input data may be a first address of the first reuse buffer. When an address allocated to the previous input data is a last address of the second reuse buffer, an address to be allocated to the current input data may be a first address of the second reuse buffer.

In another example, the first reuse buffer and the second reuse buffer may have respective rotational address systems. With respect to previous input data and current input data included in the loaded input data, when an address allocated to the previous input data is a last address of the first reuse buffer, an address to be allocated to the current input data may be a first address of the second reuse buffer. When an address allocated to the previous input data is a last address of the second reuse buffer, an address to be allocated to the current input data may be a first address of the first reuse buffer.

The buffer controller may flush an address allocated to remaining input data, other than input data overlapping input data corresponding to output data on which a convolution operation is to be performed, among input data loaded in a previous clock. The loader may then load the remaining input data, other than the previous clock loaded overlapping input data, among the input data corresponding to the output data on which the convolution operation is to be performed.

Figure 2:
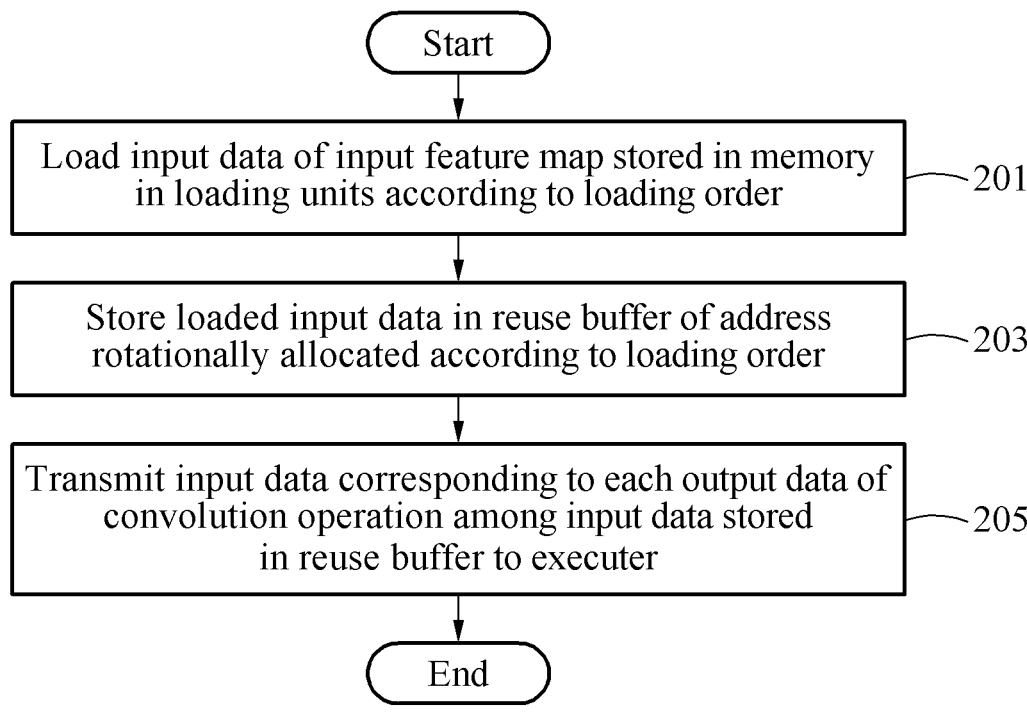
FIG. 2 is a flowchart illustrating an example data sharing in convolution operations.

FIG. 2 is a flowchart illustrating an example data sharing in convolution operations.

In operation 201, a loader loads input data of an input feature map stored in a memory in loading units according to a loading order. For example, a pre-trained neural network may receive a captured image and output an input feature map. The input feature map may be stored in a memory. Alternatively, the loader loads the input data of the captured image stored in the memory, in the loading units according to the loading order.

In operation 203, a reuse buffer stores the loaded input data in the reuse buffer of an address rotationally allocated according to the loading order. A buffer controller may calculate an address to store the input data. When an address allocated to previous input data is a last address of the reuse buffer, an address to be allocated to current input data may be a first address of the reuse buffer.

In operation 205, each of a plurality of senders transmits to an executer input data corresponding to each output data of respective convolution operations, from among the input data stored in the reuse buffer. Here, since portions of input data transmitted by the plurality of senders overlap each other, the plurality of senders may share the input data of the reuse buffer.

Figure 3:
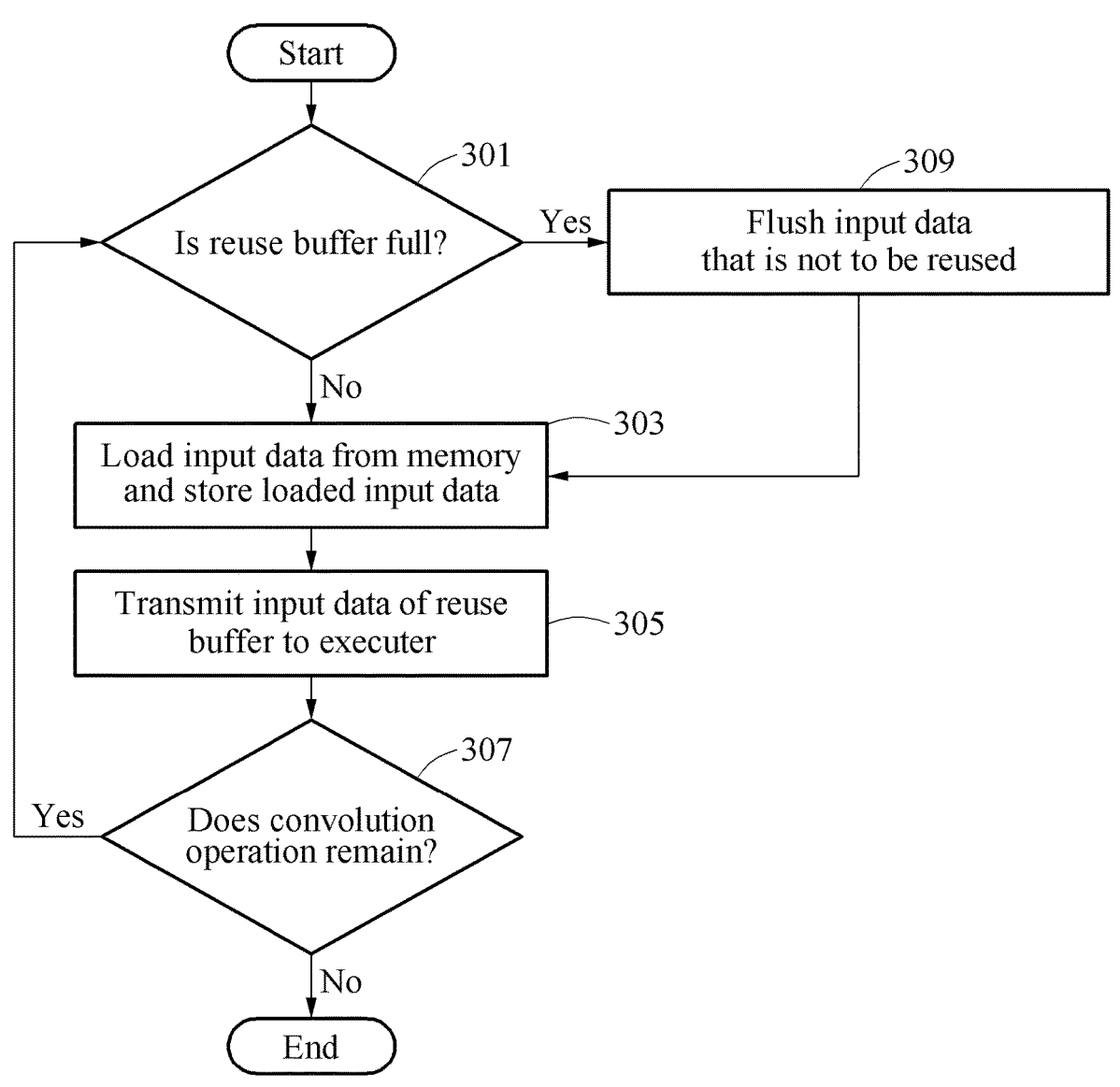
FIG. 3 is a flowchart illustrating an example data sharing in convolution operations.

FIG. 3 is a flowchart illustrating an example of a data sharing in convolution operations.

Operations of FIG. 3 may be performed in one unit of time. For example, one unit of time may include a clock (e.g., a clock cycle). After all operations are performed, if a condition of operation 307 is satisfied, the operations of FIG. 3 may be repeated.

In operation 301, a buffer controller may determine (or designate) whether a reuse buffer is full. In operation 309, when the reuse buffer is full, the buffer controller may flush input data that will not be reused, e.g., previously loaded data that will not be overlapping data with input data for subsequent convolution operations. Said another way, the buffer controller may flush an address allocated to input data in the reuse buffer, other than input data overlapping input data corresponding to output data on which a convolution operation is to be performed, among input data loaded in a previous clock.

In operation 303, when the reuse buffer is not full or flushing has been performed, a loader loads input data from a memory and the reuse buffer may store the loaded input data. The buffer controller may determine (or designate) which of the loaded input data in the reuse buffer corresponds to which output data based on which convolution operation is to be performed. The loader may load the input data in loading units according to a loading order.

In operation 305, each of a plurality of senders may fetch at least one required input data from the reuse buffer and transmit the fetched input data to an executer. The input data transmitted by each of the senders may be redundant, and thus, the two or more of the plurality of senders may share input data stored in the reuse buffer. For example, the two or more senders may share some same input data stored in the reuse buffer and respectively different input data stored in the reuse buffer. The executer may perform respective convolution operations based on the corresponding input data and a convolution weight, for example.

In operation 307, whether a convolution operation remains to be performed may be determined. When a convolution operation remains, operation 301 may be performed again. When no convolution operation remains to be performed, the process of FIG. 3 may terminate.

Figure 4:
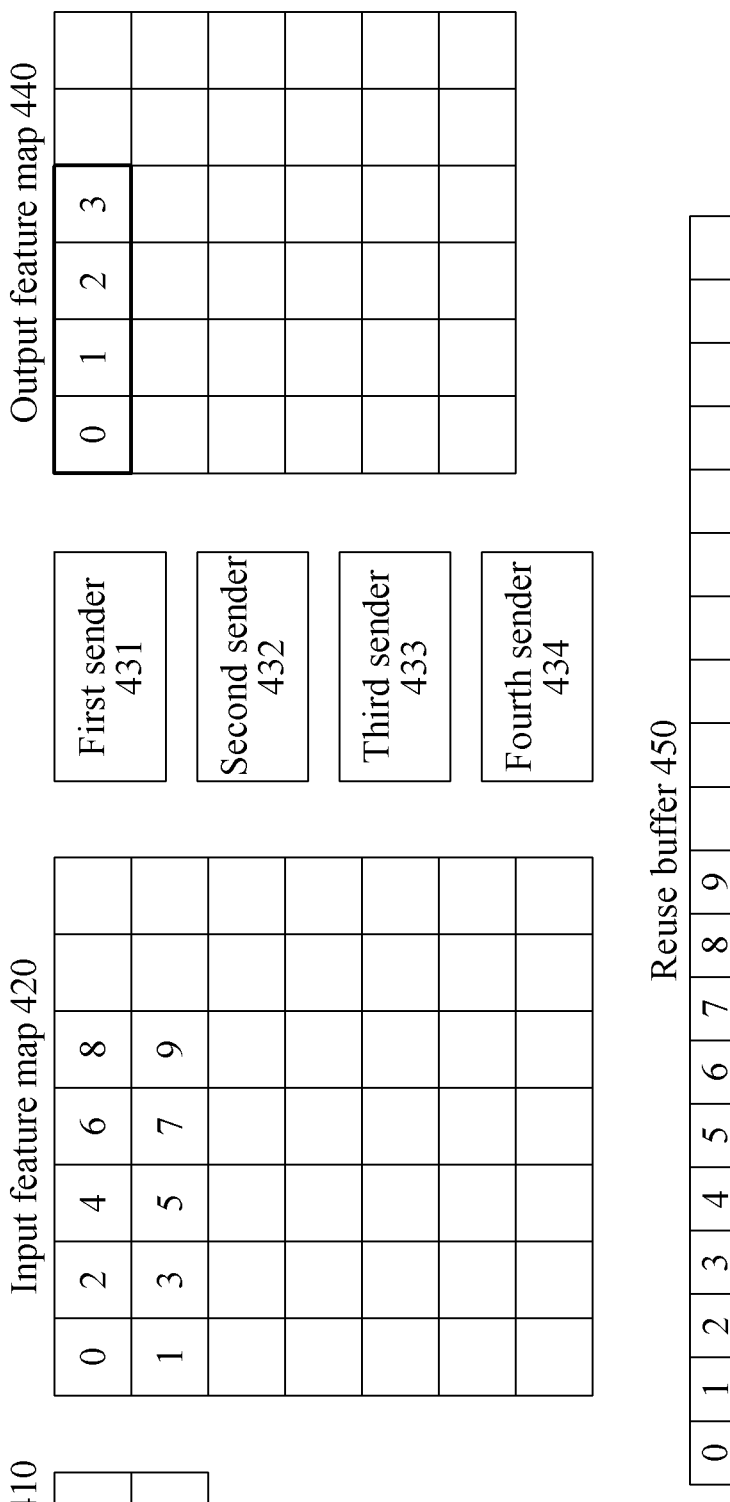
FIGS. 4-5 are diagrams illustrating example convolution operations.
Figure 5:
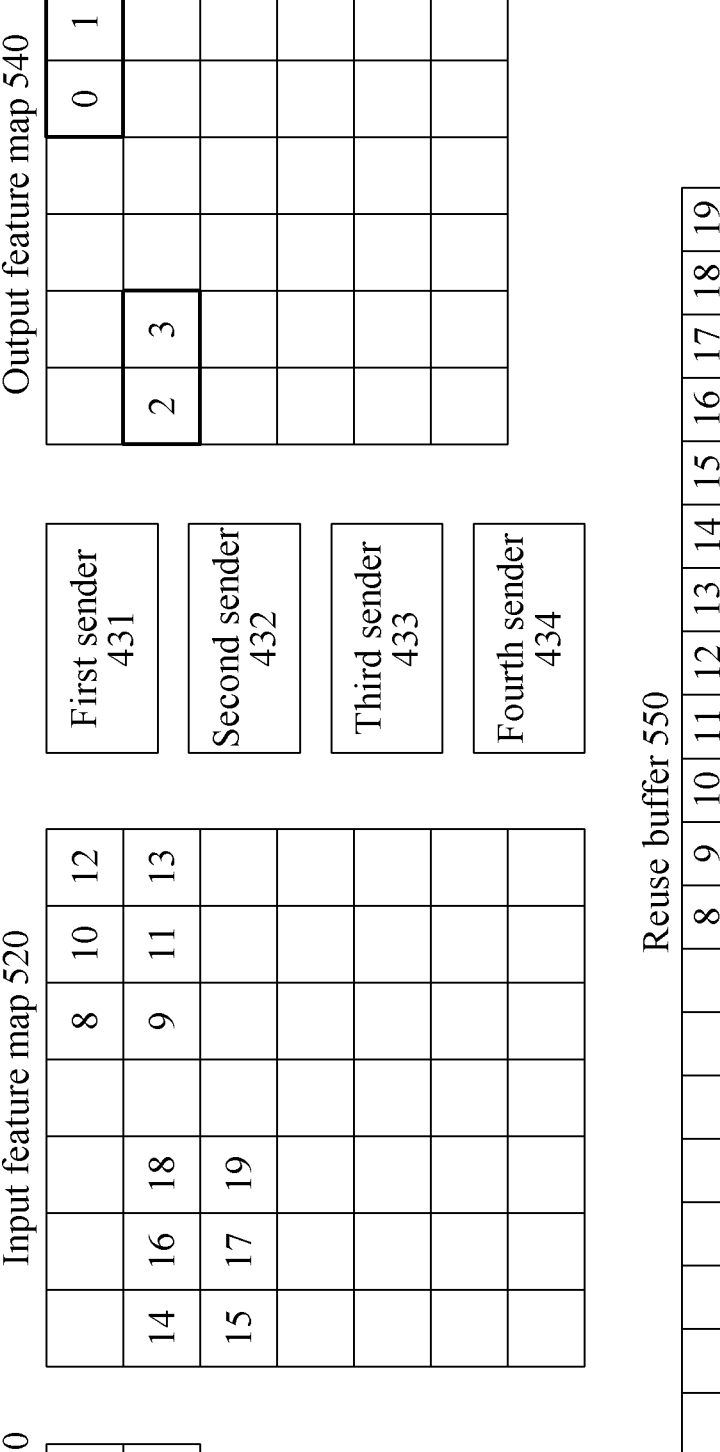

FIGS. 4-5 are diagrams illustrating example convolution operations.

FIGS. 4 and 5 show examples of how senders share input data based on positions of output pixels calculated simultaneously, using an example where a number of senders is four and a size of a convolution weight 410 is 2×2. FIG. 4 illustrates a convolution operation performed in a first clock. The convolution weight 410 corresponds to each area of 2×2 of an input feature map 420. FIG. 5 illustrates storing or transmitting in a next second clock.

In this example, the input feature map 420 may have a size of 7×7. A feature value may be stored for each pixel of the input feature map 420. The input feature map 420 may be acquired from an input image from a pre-trained neural network, for example. An identification (or index) number between 0 and 48 may be allocated to identify (or index) each pixel or pixel value of the input feature map 420. FIG. 4 shows identification numbers from 0 to 9 of the input feature map 420, while identification numbers from 10 to 48 are omitted for brevity of description.

The buffer controller may determine (or designate) input data for a convolution operation of identified (or indexed) output data 0 through output data 3 of an output feature map 440. The buffer controller may determine input data 0 through input data 3 to correspond to the output data 0, e.g., as a result of a convolution operation between the determined input data 0 through 3 and the convolution weight 410. Similarly, the buffer controller may determine input data 2 through input data 5 to correspond to output data 1, may determine input data 4 through input data 7 to correspond to output data 2, and may determine input data 6 through input data 9 to correspond to the output data 3.

A loader may load, from a memory, respective input data in the input feature map 420 stored in the memory. For example, the loader may load the input data 0 through the input data 9 based on ten loading units. The loader may also load input data in an order of upper left, lower left, upper right, and lower right, e.g., with respect to each application of the convolution weight 410 to the corresponding input data. For example, the loader may load input data 0, input data 1, input data 2, and input data 3 for an application of the convolution weight 410 to generate the output data 0, and, as the loaded input data 2 and 3 will be shared in the application of the convolution weight 410 to generate the output data 1, the loader may load input data 4 and input data 5 for the application of the convolution weight 410 to input data 2-5 to generate the output data 1.

The buffer controller may calculate addresses to be allocated to input data corresponding to output data on which a convolution operation is to be performed. For example, the buffer controller may store the loaded input data in addresses allocated rotationally according to a loading order. A reuse buffer 450 may have a size of 20. When the reuse buffer is full, an address of a first storage space may be allocated. Thus, in the above example, the reuse buffer 450 may store at least the input data 0 through the input data 9.

A first sender 431, a second sender 432, a third sender 433, and a fourth sender 434 may correspond to the output data 0 through the output data 3 of the output feature map 440, respectively. For example, the first sender 431 may transmit a plurality of input data (e.g., input data 0-3) for a convolution operation of the output data 0 to an executer. The second sender 432 may transmit a plurality of input data (e.g., input data 2-5) for a convolution operation of the output data 1 to the executer. The third sender 433 may transmit a plurality of input data (e.g., input data 4-7) for a convolution operation of the output data 2 to the executer. The fourth sender 434 may transmit a plurality of input data (e.g., input data 6-9) for a convolution operation of the output data 3 to the executer. The first sender 431, the second sender 432, the third sender 433, and the fourth sender 434 may share overlapping loaded input data, e.g., input data 2 through 7.

The executer may perform the convolution operation on the input data 0 through the input data 3 and the convolution weight 410, thereby generating the output data 0. The executer may perform the convolution operation on the input data 2 through the input data 5 and the convolution weight 410, thereby generating the output data 1. The executer may perform the convolution operation on the input data 4 through the input data 7 and the convolution weight 410, thereby generating the output data 2. The executer may perform the convolution operation on the input data 6 through the input data 9 and the convolution weight 410, thereby generating the output data 3.

FIG. 5 illustrates the convolution operation performed in the second clock. FIG. 5 shows identification numbers (or indices) from 8 to 19 of an input feature map 520, noting that identification numbers (or indices) from 0 to 7 (described above) and from 20 to 48 are omitted for brevity of description.

The buffer controller may determine (or designate) the corresponding input data for each convolution operation to generate the identified (or indexed) output data 0 through output data 3 of an output feature map 540. The buffer controller may determine (or designate) input data 8 through input data 11 to correspond to the output data 0, e.g., as a result of a convolution operation between the determined input data 8 through 11 and the convolution weight 410. Similarly, the buffer controller may determine input data 10 through input data 13 to correspond to the output data 1. The buffer controller may determine input data 14 through input data 17 to correspond to the output data 2. The buffer controller may determine input data 16 through input data 19 to correspond to the output data 3.

The loader may load, from the memory, respective input data in the input feature map 520 stored in the memory. For example, the loader may load the input data 10 through the input data 19 based on ten loading units. The loader may also load input data in an order of upper left, lower left, upper right, and lower right, e.g., with respect to each application of the convolution weight 410 to the corresponding input data. For example, the loader may load input data 10 and input data 11 for the convolution operation between convolution weight 410 and reuse the previously loaded input data 8-9 (previously loaded in clock 1 in FIG. 4) and currently loaded input data 10-11, to generate the output data 0. Similarly, as the loaded input data 10 and 11 will be shared in the next application of the convolution weight 410 to generate the output data 1, the loader may load input data 12 and input data 13 for the application of the convolution weight 410 to input data 10-13 to generate the output data 1. A loading count may be reduced through temporal sharing, e.g., sharing loaded data across different clocks.

In another example of such sharing of loaded data across different clocks, where the reuse buffer 550 is the same reuse buffer as reuse buffer 450, and loadings of input data 1, 3, and 5 (corresponding to inputs data 14, 16, and 19 of FIG. 5) have also already been performed and stored in the reuse buffer 550 in the first clock (in addition to the previous loading of input data 8 and 9 in the first clock), the loader may still load other non-reused input data in an order of upper left, lower left, upper right, and lower right, e.g., with respect to each application of the convolution weight 410 to the corresponding input data. For example, the loader may load only input data 15 and input data 17 for an application of the convolution weight 410 to generate the output data 2, and may load only input data 19 for an application of the convolution weight 410 to generate the output data 3 considering that input data 16 and 18 were already loaded in the first clock (as input data 3 and 5 in the first clock with respect to FIG. 4) and input data 17 was already loaded in the immediately previous loading of input data for the generation of the output data 2 in the second clock.

Alternatively, inputs data 14, 16, and 19 may be loaded again in the second clock. For example, the buffer controller may calculate addresses to be allocated to input data corresponding to output data on which a convolution operation is to be performed, and may store the input data 10 through the input data 19 to the reuse buffer 550. The input data 8 and the input data 9 may be data already stored in the first clock.

The first sender 431, the second sender 432, the third sender 433, and the fourth sender 434 may correspond to the output data 0 through the output data 3 of the output feature map 540, respectively. For example, the first sender 431 may transmit a plurality of input data (e.g., input data 8-11) for a convolution operation of the output data 0 to the executer. The second sender 432 may transmit a plurality of input data (e.g., input data 10-13) for a convolution operation of the output data 1 to the executer. The third sender 433 may transmit a plurality of input data (e.g., input data 14-17) for a convolution operation of the output data 2 to the executer. The fourth sender 434 may transmit a plurality of input data (e.g., input data 16-19) for a convolution operation of the output data 3 to the executer. As noted above, the first sender 431 and the second sender 432 share the input data 10 and the input data 11. Likewise, the third sender 433 and the fourth sender 434 share the input data 16 and the input data 17.

The executer may perform a convolution operation on the input data 8 through the input data 11 and the convolution weight 410, thereby outputting the output data 0. The executer may perform a convolution operation on the input data 10 through the input data 13 and the convolution weight 410, thereby outputting the output data 1. The executer may perform a convolution operation on the input data 14 through the input data 17 and the convolution weight 410, thereby outputting the output data 2. The executer may perform a convolution operation on the input data 16 through the input data 19 and the convolution weight 410, thereby outputting the output data 3. When all convolution operations are performed to generate the entire output feature map, the convolution of the input feature map and the convolution weight 410 may be considered complete. When there are plural input channels, then the entire output feature map may be considered complete when all convolution operations are performed between each channel of the input feature map and each respective channel (convolution weight 410) of the kernel. When there are plural kernels, each with one or more channels depending on the number of channels of the input feature map, each of the plural corresponding channels of the output feature map may be respectively generated with the above described sharing of overlapping inputs where overlapping of inputs occurs in different convolution operations.

Figure 6:
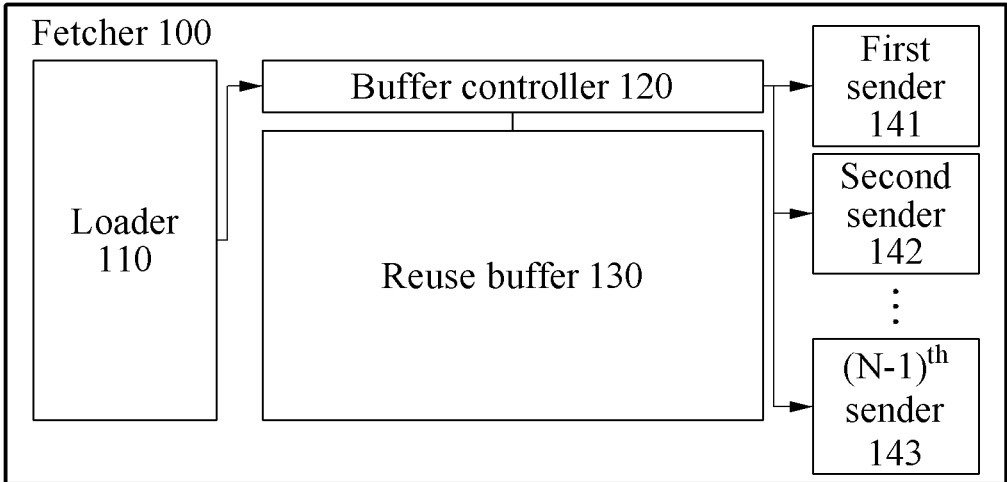
FIG. 6 is a diagram illustrating an example fetcher.

FIG. 6 is a diagram illustrating an example fetcher.

The fetcher 100 includes the loader 110, the plurality of senders 141, 142, and 143, the buffer controller 120, and the reuse buffer 130. As a non-limiting example, the fetcher 100 may correspond to the fetcher 100 of FIG. 1.

The loader 110 loads input data of an input feature map stored in a memory in loading units according to a loading order. The loader 110 may load remaining input data, other than input data overlapping input data loaded in a previous clock, among input data which a convolution operation is to be performed to generate a corresponding output data.

The buffer controller 120 may flush an address allocated to remaining input data, other than input data overlapping input data corresponding to output data on which a convolution operation is to be performed, among input data loaded in a previous clock. For example, if no further convolution operations are to be performed presently or in the future with respect to any input data that has already been loaded, e.g., where such data will not be reused or is not overlapping data, then the addresses of these input data that have already been loaded may be flushed.

The buffer controller 120 may store the loaded input data in the reuse buffer 130 of an address rotationally allocated according to the loading order, for example. With respect to previous input data in the reuse buffer 130, when an address allocated to the previous input data is a last address of the reuse buffer 130, an address to be allocated to the current input data may be a first address of the reuse buffer 130 and the buffer controller 120 may store the current input data in the reuse buffer 130 in the newly allocated addresses.

Each of the plurality of senders 141, 142, and 143 transmits input data corresponding to each output data of a convolution operation among the input data stored in the reuse buffer 130 to an executer. Portions of input data transmitted by the plurality of senders 141, 142, and 143 overlap each other. For example, the first sender 141 may transmit first plural input data corresponding to a convolution operation of a convolution weight for a first output data, while second sender 142 may transmit second plural input data (including some of the first plural input data) corresponding to a convolution operation of the convolution weight for another particular output data, demonstrating the spatial reuse of the reuse buffer 130 in a same clock.

For example, with an example size of the convolution weight being 2×2, the reuse buffer 130 may be spatially reused by the first sender 141 and the second sender 142, of a plurality of senders of the fetcher 100. The first sender 141 may correspond to the first output data. The second sender 142 may correspond to the second output data adjacent to the first output data. First input data, second input data, third input data, fourth input data, fifth input data, and sixth input data may be stored in a first address, a second address, a third address, a fourth address, a fifth address, and a sixth address of the reuse buffer 130, respectively. As an example, the input feature map may correspond to the input feature map 420 of FIG. 4, e.g., where the first through sixth input data are respectively identified/indexed as input data "0" through input data "5". With respect to FIG. 6, the first sender 141 may transmit the first input data, the second input data, the third input data, and the fourth input data to the executer for a convolution operation between the first input data, the second input data, the third input data, and the fourth input data and the 2×2 convolution weight. The second sender 142 may transmit the third input data, the fourth input data, the fifth input data, and the sixth input data to the executer. In this example, the first sender 141 and the second sender 142 may transmit their respective input data in an example first clock.

As another example, with an example size of the convolution weight being 2×2, the reuse buffer 130 may be temporally reused by the first sender 141 and the second sender 142, of the plurality of senders of the fetcher 100. As noted above, in the previous clock (e.g., in the above first clock), the first sender 141 may correspond to first output data and the second sender 142 may correspond to second output data adjacent to the first output data, and loaded first input data, second input data, third input data, fourth input data, fifth input data, and sixth input data may be stored in a first address, a second address, a third address, a fourth address, a fifth address, and a sixth address of the reuse buffer 130, respectively. In a current (or second) clock, the first sender 141 may correspond to third output data and the second sender 142 may correspond to fourth output data adjacent to the third output data. Among the fifth input data, the sixth input data, seventh input data, eighth input data, ninth input data, and tenth input data corresponding to the third output data and the fourth output data on which respective convolution operations are to be performed, the loader 110 may load remaining input data, other than the fifth input data and the sixth input data overlapping the input data loaded in the previous clock, i.e., the loader may load only the seventh input data, eighth input data, ninth input data, and tenth input data.

In the current clock, the first sender 141 may correspond to third output data and the second sender 142 may correspond to fourth output data adjacent to the third output data. The loader 110 may flush addresses allocated to the first input data, the second input data, the third input data, and the fourth input data, other than the fifth input data and the sixth input data overlapping input data corresponding to the third output data and the fourth output data on which respective convolution operations are to be performed, among input data loaded in the previous clock. In another example, the loader 110 may flush addresses allocated to the first input data and the third input data and not flush addresses allocated to the second input data and the fourth input data, as the second input data and the fourth input data stored in the reuse buffer 130 may be used in a later clock in an example where the stride of the convolution operation is 1 and the convolution weight is 2×2. For example, in the previous clock that applies the convolution weight to the first input data through the fourth input data, the first input data may have been an upper left input, the second input data may have been a lower left input, the third input data may have been an upper right input, and the fourth input data may have been a lower right input corresponding to the convolution weight. However, during the later clock, the convolution weight may be applied to the later input data, shifted down one line according to the stride of 1 of the convolution operations, and thus, the convolution weight may be applied to the second and fourth input data (as well as the respectively current later clock loaded input data) as they may now be considered the upper left and upper right inputs in this current convolution operation.

In another example, a fetcher includes the loader 110, the plurality of senders 141, 142, and 143, the buffer controller 120, and a plurality of reuse buffers. The plurality of reuse buffers may include a first reuse buffer and a second reuse buffer.

The loader 110 loads input data of an input feature map stored in a memory in loading units according to a loading order. As an example, with respect to previous input data and current input data included in the loaded input data, when an address allocated to the previous input data is a last address of the first reuse buffer, an address to be allocated to the current input data may be a first address of the first reuse buffer. When an address allocated to the previous input data is a last address of the second reuse buffer, an address to be allocated to the current input data may be a first address of the second reuse buffer. As another example, with respect to previous input data and current input data included in the loaded input data, when an address allocated to the previous input data is a last address of the first reuse buffer, an address to be allocated to the current input data may be a first address of the second reuse buffer. When an address allocated to the previous input data is a last address of the second reuse buffer, an address to be allocated to the current input data may be a first address of the first reuse buffer.

The buffer controller 120 may flush an address allocated to remaining input data other than input data overlapping input data corresponding to output data on which a convolution operation is to be performed among input data loaded in previous clock(s). The loader 110 may load remaining input data other than input data overlapping input data loaded in a previous clock among input data corresponding to output data on which a convolution operation is to be performed.

The buffer controller 120 may allocate an address of the first reuse buffer or the second reuse buffer rotationally to the loaded input data according to the loading order and store the loaded input data in the allocated address.

Each of the plurality of senders 141, 142, and 143 transmits input data corresponding to output data of respective convolution operations among input data stored in the first reuse buffer or the second reuse buffer to an executer. Portions of input data transmitted by the plurality of senders 141, 142, and 143 overlap each other.

Figure 7:
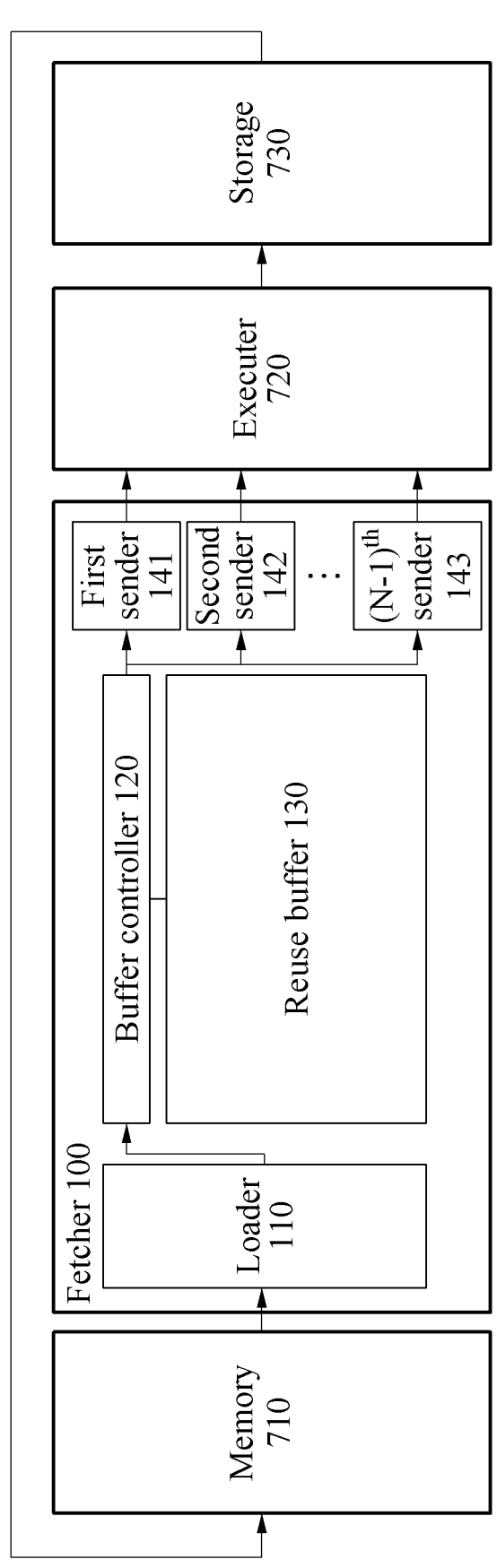
FIG. 7 is a diagram illustrating an example computing device.

FIG. 7 is a diagram illustrating an example computing device.

The computing device includes a memory 710, a fetcher 100, a loader 110, a buffer controller 120, an executer 720, and a storage 730. As non-limiting respective examples, the memory 710 may correspond to the input feature maps 101 of FIG. 1 or any of the memory representing input feature maps or convolution weights described herein, the storage 730 may correspond to the output feature map 102 of FIG. 1 or any of the memory representing output data described herein, each of the fetcher 100, the loader 110, the buffer controller 120, the reuse buffer 130, and the first through (N−1)th senders may correspond to the fetcher 100, the loader 110, the buffer controller 120, the reuse buffer 130, and the first through (N−1)th senders of either or both of FIGS. 1 and 6 or any of the fetchers, the loaders, the buffer controllers, the reuse buffers, and the senders described herein. In addition, while the storage 730 is described with respect to an output feature map, and the memory 710 is described with respect to an input feature map, the output feature map may become the input feature map for a next neural network layer, for example, and thus the storage 730 may correspond to the memory 710 when the computing device implements the next neural network layer.

The fetcher 100 includes the loader 110, the plurality of senders 141 and 142 through 143, the reuse buffer 130, and the buffer controller 120.

The loader 110 loads input data of an input feature map stored in the memory 710 in loading units according to a loading order.

The buffer controller 120 allocates an address of the reuse buffer 130 to the loaded input data rotationally according to the loading order and stores the loaded input data in the allocated address.

Each of the plurality of senders 141 through 143 transmits input data corresponding to each output data of a convolution operation among the input data stored in the reuse buffer 130 to the executer 720. Portions of input data transmitted by the plurality of senders 141, 142, and 143 may overlap each other, e.g., without at least some respective multiple loadings of such overlapped input data.

The executer 720 performs a convolution operation for input data received from each of the plurality of senders 141, 142, and 143, outputs output data corresponding to each of the plurality of senders, and stores the output data in the storage 730.

The memories, the fetchers, the loaders, the buffer controllers, the reuse buffers, and senders, executers, and storages of FIGS. 1-7 are implemented by hardware components.

Examples of hardware components that may be used to perform the operations described in this application where appropriate include controllers, sensors, generators, drivers, memories, comparators, systolic arrays and the like, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers, e.g., in cooperation with one or more systolic arrays as non-limiting examples. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods of FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, as well as one or more systolic arrays in combination therewith as a non-limiting example, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, as well as one or more systolic arrays in combination therewith, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method, the method comprising:

loading, by a loader, input data of an input feature map stored in a memory in loading units according to a loading order;

storing, by a buffer controller, the loaded input data in a reuse buffer of an address rotationally allocated according to the loading order; and transmitting, by each of a plurality of senders, to an executer, respective input data corresponding to each output data of respective convolution operations among the input data stored in the reuse buffer, wherein portions of the transmitted respective input data overlap each other, and wherein the rotational allocation comprises, with respect to previous input data and current input data included in the loaded input data, allocating a first address of the reuse buffer to the current input data in response to an address allocated to the previous input data being a last address of the reuse buffer.

2. The method of claim 1, wherein a portion of a transmitted input data of the transmitted respective input data is stored in the reuse buffer by the storing of the loaded input data, and another portion of the transmitted input data is obtained through spatial and/or temporal sharing of same data stored in the reuse buffer.

3. The method of claim 2, wherein the respective input data is not redundantly stored in the reuse memory.

4. The method of claim 1, wherein the loading comprises:

loading remaining input data, other than input data overlapping input data loaded in a previous clock, among input data corresponding to output data on which a convolution operation is to be performed.

5. The method of claim 4, wherein the plurality of senders comprises a first sender and a second sender, in the previous clock:

the first sender corresponds to first output data;

the second sender corresponds to second output data adjacent to the first output data; and loaded first input data, second input data, third input data, fourth input data, fifth input data, and sixth input data are stored in a first address, a second address, a third address, a fourth address, a fifth address, and a sixth address of the reuse buffer, respectively; and in a current clock:

the first sender corresponds to third output data and the second sender corresponds to fourth output data adjacent to the third output data; and the loading comprises loading the remaining input data other than the fifth input data and the sixth input data overlapping input data loaded in the previous clock among the fifth input data, the sixth input data, seventh input data, eighth input data, ninth input data, and tenth input data corresponding to the third output data and the fourth output data.

6. A processor implemented method, the method comprising:

loading, by a loader, input data of an input feature map stored in a memory in loading units according to a loading order;

storing, by a buffer controller, the loaded input data in a reuse buffer of an address rotationally allocated according to the loading order;

transmitting, by each of a plurality of senders, to an executer, respective input data corresponding to each output data of respective convolution operations among the input data stored in the reuse buffer; and flushing an address allocated to remaining input data, other than input data overlapping input data corresponding to output data on which a convolution operation is to be performed, among input data loaded in a previous clock, wherein portions of the transmitted respective input data overlap each other.

7. The method of claim 6, wherein the plurality of senders comprises a first sender and a second sender, in the previous clock:

the first sender corresponds to first output data;

the second sender corresponds to second output data adjacent to the first output data; and loaded first input data, second input data, third input data, fourth input data, fifth input data, and sixth input data are stored in a first address, a second address, a third address, a fourth address, a fifth address, and a sixth address of the reuse buffer, respectively; and in a current clock:

the first sender corresponds to third output data and the second sender corresponds to fourth output data adjacent to the third output data; and flushing addresses allocated to the first input data, the second input data, the third input data, and the fourth input data, as the remaining input data, other than the fifth input data and the sixth input data overlapping input data corresponding to the third output data and the fourth output data.

8. A processor-implemented method, the method comprising:

loading, by a loader input data of an input feature map stored in a memory in loading units according to a loading order;

storing, by a buffer controller, the loaded input data in a reuse buffer of an address rotationally allocated according to the loading order; and transmitting, by each of a plurality of senders, to an executer, respective input data corresponding to each output data of respective convolution operations among the input data stored in the reuse buffer, wherein portions of the transmitted respective input data overlap each other, and wherein the plurality of senders comprises a first sender and a second sender, the first sender corresponds to first output data, the second sender corresponds to second output data adjacent to the first output data, first input data, second input data, third input data, fourth input data, fifth input data, and sixth input data are stored in a first address, a second address, a third address, a fourth address, a fifth address, and a sixth address of the reuse buffer, respectively, and the transmitting comprises:

transmitting, by the first sender, the first input data, the second input data, the third input data, and the fourth input data to the executer to perform a first convolution operation; and transmitting, by the second sender, the third input data, the fourth input data, the fifth input data, and the sixth input data to the executer to perform a second convolution operation.

9. The method of claim 1, further comprising performing, by a neuro processor unit (NPU) or neural accelerator that include the executer, the respective convolution operations of the respective input data and corresponding convolution weights, to generate respective outputs of an output map.

10. The method of claim 1, wherein the reuse buffer includes a first reuse buffer and a second reuse buffer and the storing includes allocating, by the buffer controller, an address of the first reuse buffer or the second reuse buffer rotationally to the loaded input data according to the loading order.

11. A non-transitory computer-readable storage medium storing instructions that, when executed by a processor, configure the processor to perform the method of claim 1.

12. A processor-implemented method of a fetcher that includes a first reuse buffer and a second reuse buffer, the method comprising:

loading, by a loader of a fetcher, input data of an input feature map stored in a memory in loading units according to a loading order;

allocating, by a buffer controller of the fetcher, an address of the first reuse buffer or the second reuse buffer rotationally to the loaded input data according to the loading order, and storing the loaded input data in the allocated address; and transmitting, by each of a plurality of senders, to an executer respective input data corresponding to output data of respective convolution operations among input data stored in the first reuse buffer or the second reuse buffer, wherein portions of the transmitted respective input data overlap, and wherein the rotational allocation comprises, with respect to previous input data and current input data included in the loaded input data:

allocating a first address of the first reuse buffer to the current input data in response to an address allocated to the previous input data being a last address of the first reuse buffer, and allocating a first address of the second reuse buffer to the current input data in response to an address allocated to the previous input data being a last address of the second reuse buffer; or allocating the first address of the second reuse buffer to the current input data in response to the address allocated to the previous input data being the last address of the first reuse buffer, and allocating the first address of the first reuse buffer to the current input data in response to the address allocated to the previous input data being the last address of the second reuse buffer.

13. The method of claim 12, wherein a portion of the transmitted respective input data is stored in the first reuse buffer or the second reuse buffer by the storing of the loaded input data, and another portion of the transmitted respective data is obtained through spatial and/or temporal sharing of same data stored in the first reuse buffer or the second reuse buffer.

14. The method of claim 13, wherein the respective input data corresponding to each of the output data of the respective convolution operations is not redundantly stored in either of the first reuse memory or the second reuse memory.

15. The method of claim 12, wherein the loading comprises:

loading remaining input data, other than input data overlapping input data loaded in a previous clock, among input data corresponding to output data on which a convolution operation is to be performed.

16. The method of claim 12, further comprising:

flushing an address allocated to remaining input data, other than input data overlapping input data corresponding to output data on which a convolution operation is to be performed, among input data loaded in a previous clock.

17. A non-transitory computer-readable storage medium storing instructions that, when executed by a processor, configures the processor to perform the method of claim 12.

18. A computing device, the device comprises:

a loader;

a plurality of senders;

a buffer controller; and a reuse buffer, wherein the loader is configured to load input data of an input feature map stored in a memory in loading units according to a loading order, the buffer controller is configured to store the loaded input data in the reuse buffer of an address rotationally allocated according to the loading order, each of the plurality of senders is configured to transmit, to an executer, respective input data corresponding to each output data of respective convolution operations among the input data stored in the reuse buffer, and portions of the transmitted respective input data overlap, and the rotational allocation comprises, with respect to previous input data and current input data included in the loaded input data, an allocation of a first address of the reuse buffer to the current input data in response to an address allocated to the previous input data being a last address of the reuse buffe.

19. The device of claim 18, wherein the loader is configured to load remaining input data, other than input data overlapping input data loaded in a previous clock, among input data corresponding to output data on which a convolution operation is to be performed.

20. The device of claim 19, wherein the plurality of senders comprises a first sender and a second sender, in the previous clock:

the first sender corresponds to first output data;

the second sender corresponds to second output data adjacent to the first output data; and loaded first input data, second input data, third input data, fourth input data, fifth input data, and sixth input data are stored in a first address, a second address, a third address, a fourth address, a fifth address, and a sixth address of the reuse buffer, respectively, in a current clock:

the first sender corresponds to third output data and the second sender corresponds to fourth output data adjacent to the third output data; and the loader is configured to load the remaining input data other than the fifth input data and the sixth input data overlapping input data loaded in the previous clock among the fifth input data, the sixth input data, seventh input data, eighth input data, ninth input data, and tenth input data corresponding to the third output data and the fourth output data on which a convolution operation is to be performed.

21. The device of claim 18, wherein the buffer controller is configured to flush an address allocated to remaining input data other than input data overlapping input data corresponding to output data on which a convolution operation is to be performed among input data loaded in a previous clock.

22. The device of claim 21, wherein the plurality of senders comprises a first sender and a second sender, in the previous clock:

the first sender corresponds to first output data;

the second sender corresponds to second output data adjacent to the first output data; and loaded first input data, second input data, third input data, fourth input data, fifth input data, and sixth input data are stored in a first address, a second address, a third address, a fourth address, a fifth address, and a sixth address of the reuse buffer, respectively, in a current clock:

the first sender corresponds to third output data and the second sender corresponds to fourth output data adjacent to the third output data; and the loader is configured to flush addresses allocated to the first input data, the second input data, the third input data, and the fourth input data, as the remaining input data, other than the fifth input data and the sixth input data overlapping input data corresponding to the third output data and the fourth output data on which a convolution operation is to be performed among input data loaded in the previous clock.

23. The device of claim 18, wherein the plurality of senders comprises a first sender and a second sender, the first sender corresponds to first output data, the second sender corresponds to second output data adjacent to the first output data, first input data, second input data, third input data, fourth input data, fifth input data, and sixth input data are stored in a first address, a second address, a third address, a fourth address, a fifth address, and a sixth address of the reuse buffer, respectively, the first sender is configured to transmit the first input data, the second input data, the third input data, and the fourth input data to the executer, and the second sender is configured to transmit the third input data, the fourth input data, the fifth input data, and the sixth input data to the executer.

24. A computing device, the device comprising:
a loader;
a plurality of senders;
a buffer controller; and
a plurality of reuse buffers,
wherein the plurality of reuse buffers comprises a first reuse buffer and a second reuse buffer,
the loader is configured to load input data of an input feature map stored in a memory in loading units according to a loading order,
the buffer controller is configured to allocate an address of the first reuse buffer or the second reuse buffer rotationally to the loaded input data according to the loading order, and
store the loaded input data in the allocated address,
each of the plurality of senders is configured to transmit, to an executer, respective input data corresponding to output data of respective convolution operations among input data stored in the first reuse buffer or the second reuse buffer,
portions of the transmitted respective input data overlap, and
wherein the rotational allocation comprises, with respect to previous input data and current input data included in the loaded input data:
an allocation of a first address of the first reuse buffer to the current input data in response to an address allocated to the previous input data being a last address of the first reuse buffer, and an allocation of a first address of the second reuse buffer to the current input data in response to an address allocated to the previous input data being a last address of the second reuse buffer; or
an allocation of the first address of the second reuse buffer to the current input data in response to the address allocated to the previous input data being the last address of the first reuse buffer, and an allocation of the first address of the first reuse buffer to the current input data in response to the address allocated to the previous input data being the last address of the second reuse buffer.

25. The device of claim 24, wherein the loader is configured to load remaining input data other than input data overlapping input data loaded in a previous clock among input data corresponding to output data on which a convolution operation is to be performed.

26. The device of claim 24, wherein the buffer controller is configured to flush an address allocated to remaining input data other than input data overlapping input data corresponding to output data on which a convolution operation is to be performed among input data loaded in a previous clock.

27. A computing device, the device comprising:
a memory;
a fetcher;
a buffer controller;
an executer; and
a storage,
wherein the fetcher comprises:
a loader;
a plurality of senders; and
a reuse buffer, the loader is configured to load input data of an input feature map stored in the memory in loading units according to a loading order,
the buffer controller is configured to allocate an address of the reuse buffer to the loaded input data rotationally according to the loading order and store the loaded input data in the allocated address,
each of the plurality of senders is configured to transmit, to the executer, respective input data corresponding to each output data of respective convolution operations among the input data stored in the reuse buffer,
portions of transmitted respective input data overlap, and
the rotational allocation comprises, with respect to previous input data and current input data included in the loaded input data, an allocation of a first address of the reuse buffer to the current input data in response to an address allocated to the previous input data being a last address of the reuse buffer.

28. The device of claim 27, wherein the executer is configured to:
perform the respective convolution operations with respect to the respective input data received from each of the plurality of senders;
output output data corresponding to each of the plurality of senders; and
store the output data in the storage.

29. A processor-implemented method of a computing device, the method comprising:
loading, in loading units according to a loading order, input data of an input feature map stored in a memory exterior to the computing device;
storing the loaded input data in a reuse buffer of the computing device according to addresses rotationally allocated according to the loading order; and
transmitting to an executer respective input data, corresponding to each output data of respective convolution operations, among the input data stored in the reuse buffer,
wherein a portion of the transmitted respective input data is spatially and/or temporally shared with respect to a single storing of the portion in the reuse memory, and
wherein the rotational allocation comprises, with respect to previous input data and current input data included in the loaded input data, allocating a first address of the reuse buffer to the current input data in response to an address allocated to the previous input data being a last address of the reuse buffer.

30. The method of claim 29, wherein the respective input data is not redundantly stored in the reuse memory.

31. The method of claim 29, further comprising performing, by a neuro processor unit (NPU) or neural accelerator that include the executer, the respective convolution operations of the respective input data and corresponding convolution weights, to generate respective outputs of an output map, and storing the output map to an output memory exterior of the computing device.

32. The method of claim 31, wherein the computing device is the NPU or the neural accelerator.

33. The method of claim 29, wherein, of the addresses allocated according to the loading order, an address to be allocated to current input data is a first address of the reuse buffer based on an address, allocated to immediately previous loaded input data stored to the reuse buffer, being a last address of the reuse buffer.

34. The method of claim 29,
wherein, through the temporal sharing, the other portion of the transmitted respective input data is a same input data stored in the reuse buffer in a previous storing of previously loaded input data for one or more other convolution operations, and wherein the respective input data corresponding to each of the output data of the respective convolution operations includes remaining data loaded in the loading of the input data of the input feature map.

35. The method of claim 29, further comprising:

flushing an address allocated to a previous remaining input data, other than the portion of the transmitted respective input data and the other portion of the transmitted respective input data, among input data loaded in a previous clock.

36. The method of claim 1, further comprising storing the current input data in newly allocated addresses of the reuse buffer.

\* \* \* \* \*